United States Patent [19]

Neveux

[11] 4,163,415
[45] Aug. 7, 1979

[54] VENTILATION DEVICE

[75] Inventor: René E. Neveux, Les Clayes-sous-Bois, France

[73] Assignee: Societe Anonyme Francaise du Ferodo, France

[21] Appl. No.: 814,630

[22] Filed: Jul. 11, 1977

[30] Foreign Application Priority Data

Jul. 12, 1976 [FR] France ................................. 76 21342

[51] Int. Cl.² .......................... B60H 1/00; F24F 13/04
[52] U.S. Cl. ....................................... 98/2.09; 98/38 B; 98/40 VM; 137/604
[58] Field of Search ....................... 98/2.09, 2.10, 2.04, 98/2.08, 2.19, 38 A, 38 B, 38 C, 38 D, 38 R, 40 R, 40 V, 40 VM, 41 AV, 41 SV, 110; 137/604, 885

[56] References Cited

U.S. PATENT DOCUMENTS

| 2,620,983 | 12/1952 | Lyman | 98/38 B |
|---|---|---|---|
| 2,856,131 | 10/1958 | Conlan | 98/38 B |
| 2,922,580 | 1/1960 | Phillips et al. | 98/38 B |
| 3,257,931 | 6/1966 | Lupton | 98/40 VM |
| 3,298,298 | 1/1967 | Iwata | 236/49 |
| 3,572,233 | 3/1971 | Bar et al. | 98/2.09 |
| 3,901,275 | 8/1975 | Logsdon | 98/38 B |
| 3,916,774 | 11/1975 | LaBrec | 98/40 VM |
| 3,973,590 | 8/1976 | Logsdon | 98/38 B |

Primary Examiner—Henry C. Yuen
Attorney, Agent, or Firm—Kane, Dalsimer, Kane, Sullivan and Kurucz

[57] ABSTRACT

A ventilation or aeration device comprising an air vent for warm and/or fresh air. When used in a vehicle the device may serve as a window defogger by blowing warm air as well as a ventilator. In normal operation the vent may be manually manipulated as desired. When used as a defogger, opening of the warm air passage automatically directs the vent towards the window to be defogged or defrosted.

13 Claims, 12 Drawing Figures

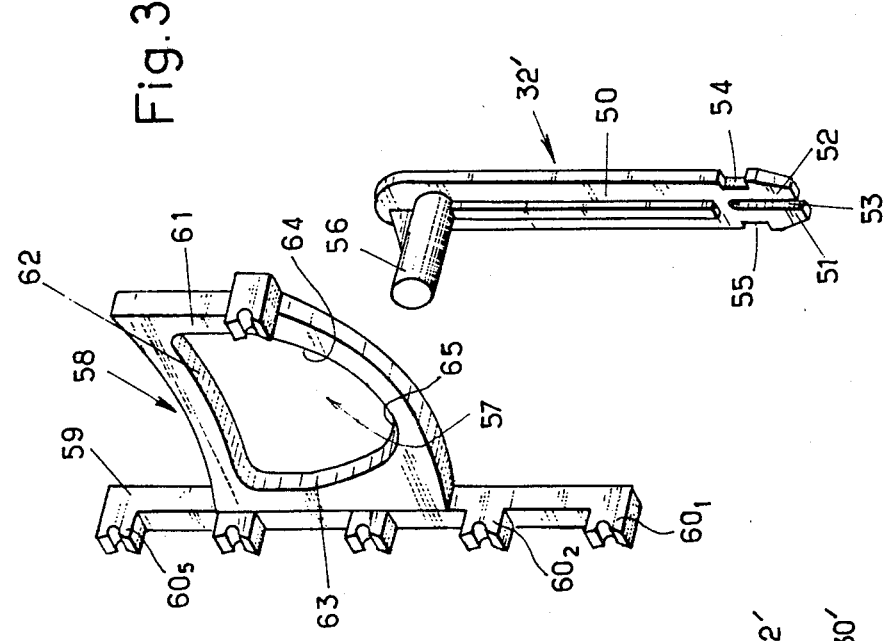
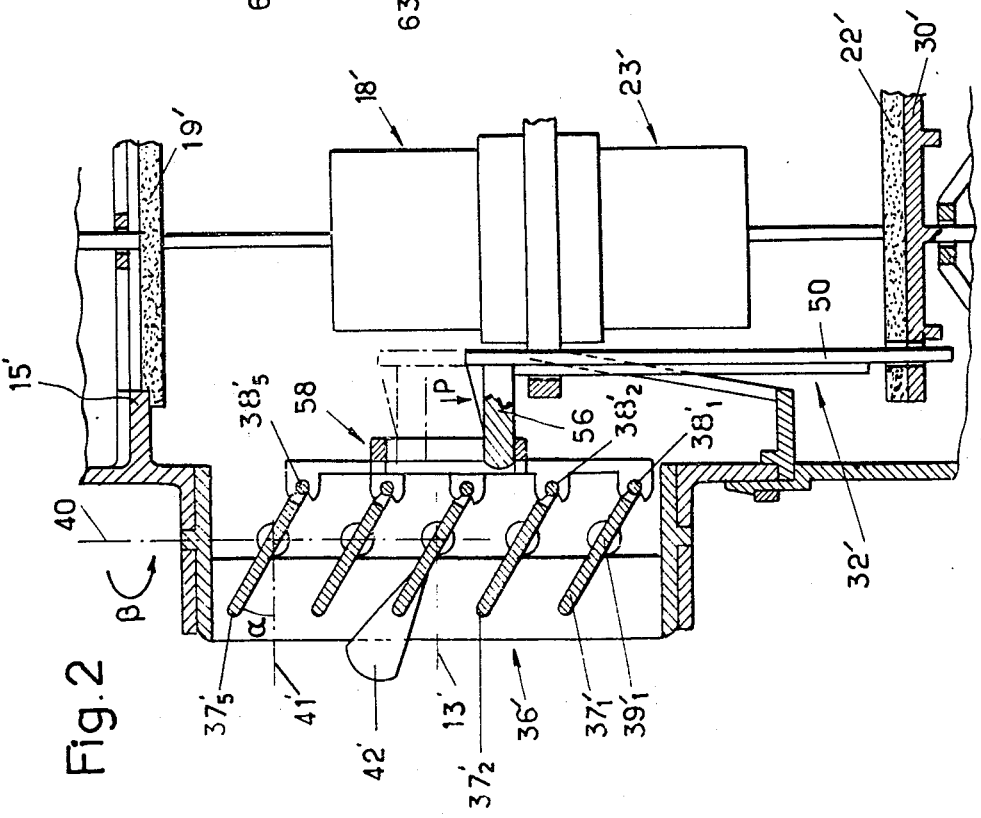

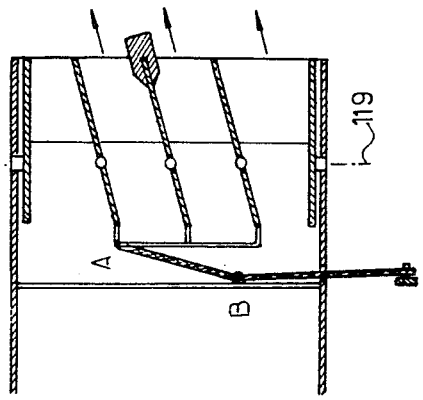
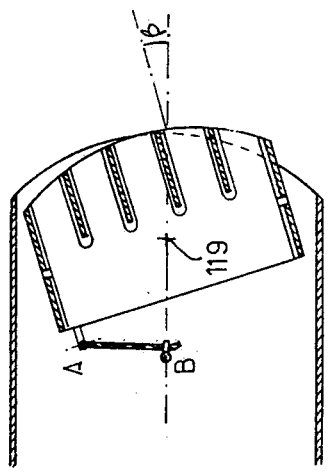
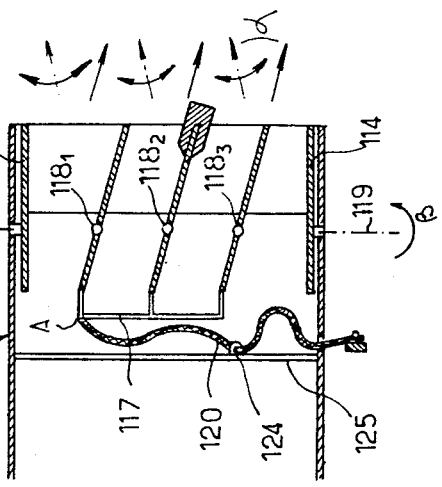
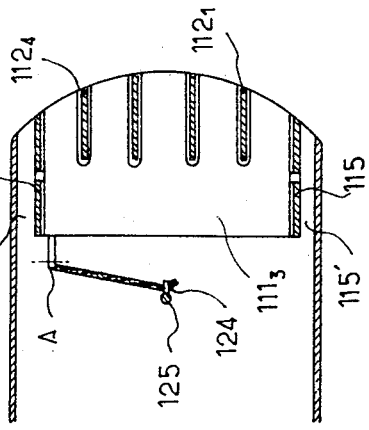
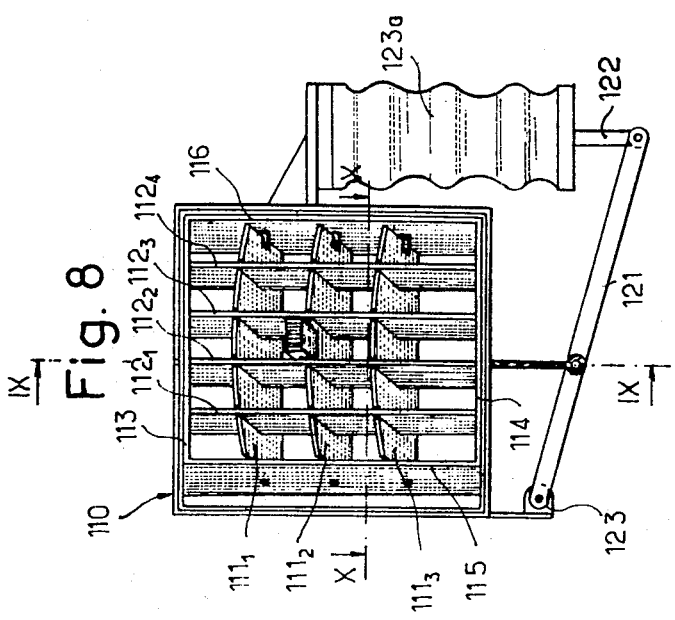

VENTILATION DEVICE

BACKGROUND OF THE INVENTION

1. Field of the Invention

The invention has for an object a ventilation or aeration device. The device may be used for ventilation of the passenger compartment of an automobile or like vehicle.

2. Description of the Prior Art

Ventilation or aeration devices for the passenger compartments of cars are known which are located on the dashboard of the car adjacent the front side windows, and permit adjustment either to direct a current of warm air on the said windows so as to defrost them, or to direct a current of fresh air towards the occupant or occupants of the front seats of the automobile. In one such known device, a first vent whose opening is directed in a non-orientable fashion towards the side windows is connected to a source of warm air, while a second vent is connected to a source of fresh air, such that the complete structure of the device is relatively complicated and cannot be adapted to the different temperature conditions and air circulation conditions which may occur, for example to direct fresh air in the direction of the side windows as is sometimes desired for the comfort of the occupants of the vehicle.

Furthermore, U.S. Pat. No. 3,298,298 teaches an air conditioning grille which is directed in different directions depending on the type of air being blown through the grille However, in the device disclosed, the grille is locked in place and cannot be manually adjusted.

SUMMARY OF THE INVENTION

It is an aim of the invention to furnish a ventilation or aeration device for the passenger compartment of an automobile or like vehicle which obviates the inconveniences recited hereinabove of known devices and which, notably, make it possible to facilitate the control of the temperature control installation while at the same time permitting greater comfort for the passengers of the car.

It is also an aim of the invention to furnish one such device which is not bulky, is simple, and which permits the satisfaction of safety requirements concerning temperature control installations of vehicular automobiles.

It is further an aim of the invention to furnish one such device adapted to be controlled by a pneumatic energy source, advantageously a source of low pressure which may be the intake of the motor of the vehicle or a low pressure source connected to the said intake.

An air ventilation or aeration device according to the invention comprises a feed for introducing warm air, a feed for introducing fresh air as well as air distribution means. The distribution means are connected to the feed for warm air as well as the feed for fresh air so that it may distribute the air coming from said feeds. The device further comprises means for controlling the feeds to said distribution means as well as transmission means for connecting said first means to said distribution means such that when said first means is in a first position said distribution means is located into a single position and cannot be displaced significantly in either the horizontal or vertical plane. When said first means is in a position different from that of the first position the distribution means is free to move in at least one direction.

An aeration device according to the invention, adapted to effect the defrosting of the side windows of the car by distribution of warm air on the said windows and the aeration of the passenger compartment of the vehicle by distribution of the fresh air is characterized in that it comprises one and only one vent for the warm air, fresh air, or mixture of warm and fresh air, a grid, or the like, for the orientation of the stream of air which the vent delivers either in the direction of the side windows, or in the direction of the passenger compartment and control means for the said grid connecting the latter to the control of the warm air feed of the device, the said means being constituted by a transmission means such as a grid, or the like, which may be oriented manually in different directions while the vent blows only fresh air or blows no air and is automatically brought into the position corresponding to defrosting, i.e., the position in which the vent is fed partially or totally by warm air.

In a first embodiment of the device, the transmission is a two armed bar having a general shape of a "bayonet" of which one of the arms is connected to the hot air feed control of the device and the other end has a slit in which a projection of a movable rig having fins attached to it constituting the vent of the grid.

In another embodiment, the transmission comprises means which permit the orientation of the air orientation vent by means of a swivel.

In a third particularly advantageous embodiment from the point of view of simplicity and cost of construction, the transmission is provided with a flexible cord which is maintained under tension while the vent is fed partially or totally with warm air and which is released when the vent blows only fresh air.

When, in this third embodiment, the said grid, or the like, for orientation of the stream of air, comprises a group of fins adapted to pivot together around substantially parallel respective axes, it is advantageous that the said cord be attached onto one of the fins or onto an element which moves said fins at an attachment point which is not located along any of the said substantially parallel axes or their extensions. In this case, the fins are preferably adapted to pivot together around a common axis extending along a direction different from that of the said substantially parallel axes, the said point of attachment of the flexible cord being thus located outside of this common axis or its extension. Preferably, in this latter case, the said cord is guided from a fixed point, this fixed point and the attachment point of the flexible cord being disposed in such a manner that the part of the flexible cord which is located, when it is extended, between these two points, has an oblique orientation with respect, on the one hand, to the direction of the said common pivot axis and, on the other hand, to the direction of the said substantially parallel axes.

It is, additionally, particularly advantageous that the device, in any of the three embodiments, comprises pneumatic activation means, such as vacuum jacks.

In such a case, the invention provides for activation of the activation means in a manner such that the deterioration of the said means themselves or of their associated elements, for example, a connecting tube to the low pressure source, automatically brings the device to the condition which is that of defrosting or defogging of the side windows.

BRIEF DESCRIPTION OF THE DRAWINGS

Other characteristics and advantages of the device according to the invention will become evident from the description which follows, done by way of example, and in reference to the annexed drawing, in which:

FIG. 2 is a partial view, analogous to that of FIG. 1, but for another embodiment of the invention;

FIG. 3 is a perspective view of the mechanical transmission element of the device of the invention shown in FIG. 2;

FIG. 8 is a front elevational view of a third embodiment of the device according to the invention, the warm air feed control being schematically represented;

FIG. 9 is a cross-sectional view along the line IX—IX of the device of FIG. 8 with the control means of the grid being located in a first position;

FIG. 10 is a cross-sectional view along the line X—X of FIG. 8 with the control means of the grid being equally located in the first position;

FIG. 11 is a view analogous to that of FIG. 9, but for a second position of the control means; and FIG. 12 is a view analogous to that of FIG. 10, but for a third position of the control means.

SUMMARY OF THE INVENTION

Figure 1:
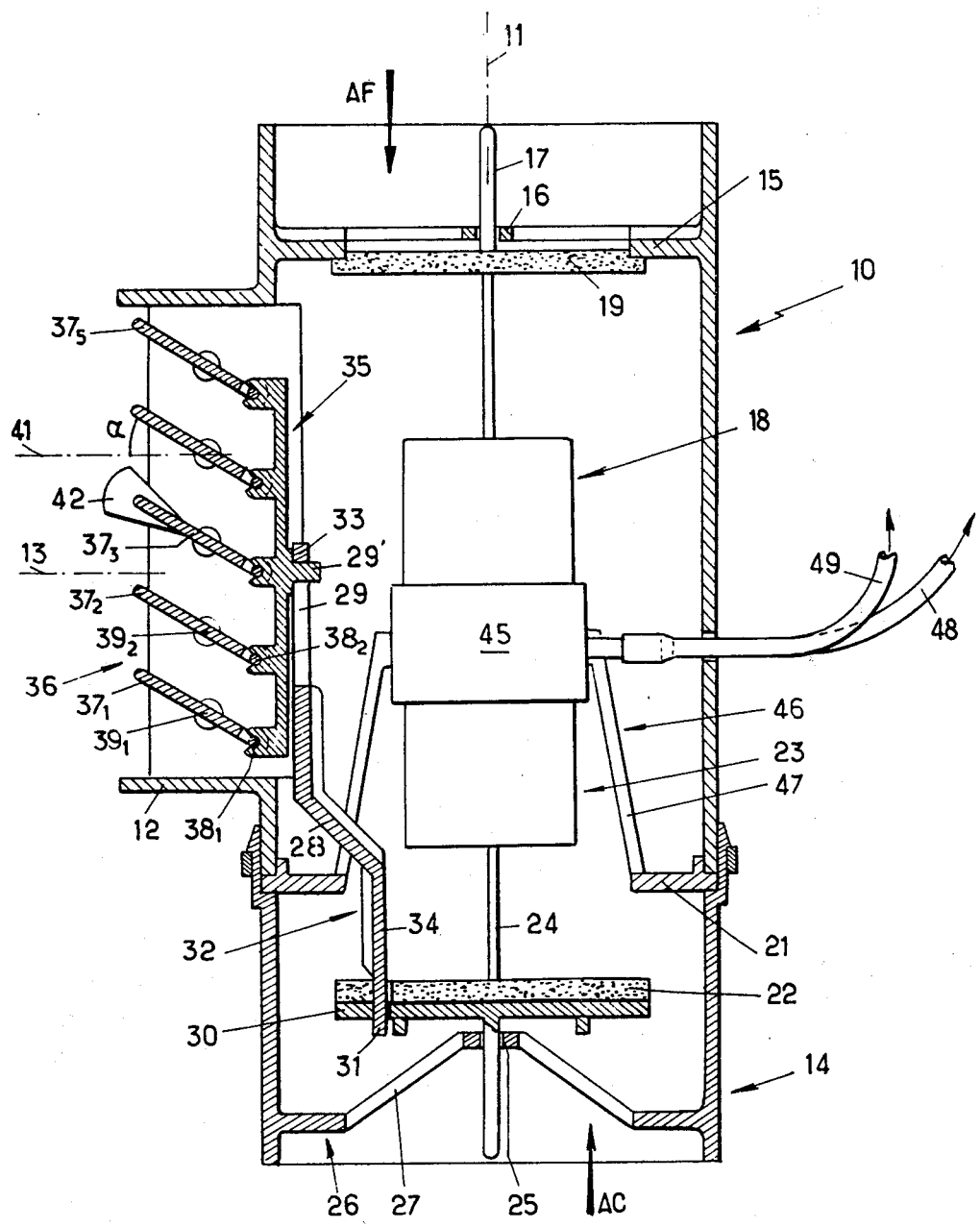
FIG. 1 is a longitudinal cross-sectional view of a first embodiment of the device according to the invention.

An aeration device for the passenger compartment of an automobile or other vehicle is shown in FIG. 1. It comprises a principal conduit 10, arranged along axis 11, to which is attached a vent 12 extending in a direction 13 perpendicular to the axis 11. This conduit is extended by a sleeve 14 having a axis coinciding with that of the axis 11 and whose diameter is the same as that of the principal conduit. This latter is provided, adjacent to its end spaced from that connected to the sleeve 14, with a valve seat 15, on the one hand, and, on the other hand, adjacent to said seat, with a guide 16 for the shaft 17 of a first pneumatic jack 18 at the top of the damper 19.

At the other end of the principal conduit 10 is provided a valve seat 21 with which is adapted to cooperate the flap head 22 of a second pneumatic jack 23 whose shaft 24 supports the head 22 and is guided through the eye 25 of a frame 26 in a tripod 27.

The damper 15–19, when it is open, permits the passage of the exterior fresh aeration air circulating in the direction of the arrow AF, while the damper 21–22 permits passage, when it is open, of the warm defrosting/defogging air flowing in the direction of the arrow AC.

According to the invention, the shaft 24 of the jack 23 carries not only the head of the flap 22 but also a plate 30 on which is attached the end 31 of a mechanical transmission 32, most simply being a rod having two parallel arms or extensions 33 and 34 connected to each other by an oblique portion 28, and thus having the conventional general shape referred to in the piping field as being a "bayonet." The arm or extension 34 is connected to the plate 30, while the arm 33 has a mouth or longitudinal hole 29 in which is located a pin 29' of a rig 35, which includes a grid 36 for the orientation of the stream of air leaving the vent 12. The grid 36 is constituted by fins $37_1$, $37_2$ ... $37_5$ mounted to pivot on the rig 35 around the shafts $38_1$, $38_2$, etc..., and on the vent around the axes $39_1$, $39_2$, etc..., such that the said grid can be oriented at an angle $\alpha$ with respect to a direction 41 parallel to the axis 13. The middle fin, $37_3$, carries a control level 42 whose role will be specified hereafter.

In the embodiment described and shown, the pneumatic jacks 18 and 23 are adjacent, coaxial, and held in the principal conduit 10 by a common annular ring 45 itself being carried by a fitting 46 originating from the flap seat 21 and constituted by rods 47.

The jacks 18 and 23 are advantageously reduced pressure or vacuum jacks connected to a reservoir or a source of reduced pressure, for example the intake line of the motor, by pipings 48 and 49, respectively, on which are interposed elements, such as vacuum interruptors or modulators (not shown).

In the embodiment illustrated in the FIGS. 2 and 3, the elements corresponding to those of the preceding embodiment have the same reference numerals but are denoted in prime numerals. The pneumatic jacks 18' and 23' control the heads of the flaps 19' and 22', this latter being joined to a plate 30' on which is attached a mechanical transmission 32' constituted by a regulator arm 50, FIG. 3. The attachment of the said regulator onto the plate 30' is accomplished by two tabs 51 and 52 of the regulator separated by a longitudinal slit 53 permitting them to be pinched together for insertion into the holes of the head 22' and the plate 30', the return to the non-compressed condition of the tabs cause the notches 54 and 55 of the body of the regulator 50 to cooperate with the head and the flap or plate. The other end of the regulator is provided with a protrusion 56 which is directed perpendicularly to the body of the regulator and is provided to cooperate with an orifice 57 of a movable rig 58 on which is attached the grid 36' having the fins $37'_1$, $37'_2$ ... $37'_2$. The rig 58 is provided on a small rod 59 having brackets $60_1$, $60_2$ ... $60_5$ providing space for shafts $38'_1$, $38'_2$ ... $38'_5$ of the fins 37'. A stem 61 which borders the office 57 is also attached to the small rod 59. As shown in FIG. 3, the orifice has a border 62, extending substantially parallel to the direction of the brackets 60 and edges 63 and 64 which, extending from the edge 62, converge towards a common point 65, the orifice 57 being limited by a cylindrical surface which, in the instance illustrated, delimits a curvilinear triangle. In this embodiment, the grid is able to orient itself in the space by means of a swivel joint at an angle $\alpha$ with respect to a direction 41' parallel to the axis 13', on the one hand, and, on the other hand, to pivot to an angle $\beta$ around an axis 40 perpendicular to the direction 41'. In a more precise fashion, as long as the projection 56 does not positively pull the rig 58 in a movement directed along the direction of arrow P, FIG. 2, i.e., for example when the projection 56 is in the condition shown in semi-dashed lines in the said figure, the grid 36' can be oriented with respect to the direction 41' and around the axis 40. The shape of the orifice 57 provides for the free movement of the movable rig with respect to the projection 56. When, to the contrary, after having been brought into contact with the summit 65, the projection 56 is displaced in the direction of the arrow P, it drags the movable rig 58, from the top to the bottom of the drawing, and the fins 37' assume the position shown in FIG. 2.

The functioning of the two embodiments described hereinabove is illustrated in FIGS. 4 to 7.

Figure 4:
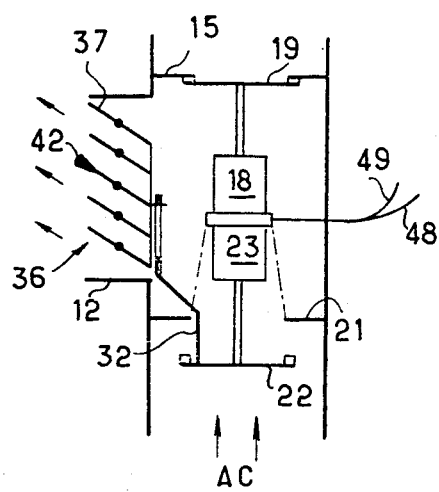
FIGS. 4 to 7 are schematic diagrams illustrating the functioning of the device of the invention.

In a first condition, which is that of the defrosting of the side windows of the front doors, FIG. 4, the aeration device installed on the dashboard of the car delivers the warm air onto the said windows by the grid 36 or 36' which is in a position such that the path taken by the stream of air coming out of the grid is optimal for the defrosting. The jacks 18 and 23 (or 18' and 23') are at rest which, in the case of vacuum jacks, corresponds to their communication with the atmosphere: the damper 15-19 (or 15'-19') is closed while the damper 21-22 (or 21'-22') is open. Warm air provided by a device controlling the temperature of the air or a heating apparatus is directed to the vent 12 (or 12'). The damper 21-22 being open, the mechanical transmission 32 of the embodiment according to FIG. 1 is in the position in which the pin 29' of the rig 35 has been moved by an end of the hole 29 to bring and maintain the fins 37 of the grid 36 into the optimal position for the defrosting. It is the same with respect to the embodiment according to FIG. 2, the mechanical transmission 32' being in the position shown in dashed lines in FIG. 2 for which the pin 56, cooperating with the apex 65 of the orifice 57, maintains the movable rig 58 which it has moved in the condition corresponding to positioning of the fins 37' of the grid 36' which is optimum for the defrosting.

Figure 5:
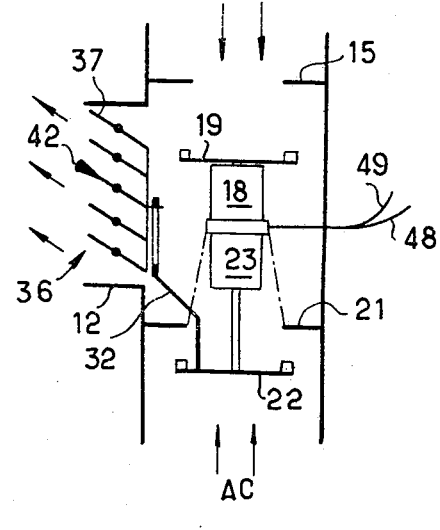

This optimum defrosting position is maintained while, as shown in FIG. 5, the jack 23 (or 23') is at rest, which in the case of a vacuum jack, for example, means being open to the atmosphere, while the jack 18 (or 18') is made operational, for example, connected to a source of reduced pressure. The damper 15-19 (or 15'-19') is thus open and the vent 12 delivers a mixture of warm air and of cool air, with a more substantial flow than that of the condition previously described.

Figure 6:
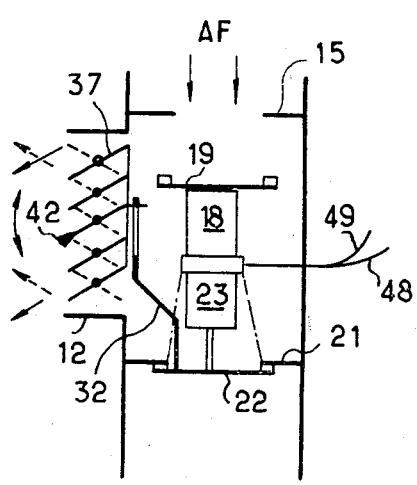

When the two jacks 18 and 23 (or 18' and 23') are simultaneously rendered operational, for example both being connected to a source of reduced pressure, the condition corresponds to that shown in FIG. 6; the damper 15-19 (or 15'-19') is open, such that fresh air penetrates into the principal conduit 10 while the damper 21-22 (or 21'-22') is closed, interrupting the passage of the warm air. In the course of its translational movement which makes it pass from the condition shown in FIG. 4 to that shown in FIG. 6, the head of the damper 22 (or 22') or more exactly the plate 30 (or 30') which is connected to it drags the mechanical transmission 32 (or 32') into a position which permits the manipulation of the grid 36 (or 36') with the aid of the lever 42 (or 42'). The fins 37 (or 37') can thus be brought into the position shown in dashed-lines in FIG. 6 in which they no longer direct the fresh air in the direction of the side windows of the doors but rather towards the occupant or occupants of the front seats of the vehicle. In this "aeration" or "ventilation" condition, a manual activation of the lever 42 (or 42') permits the modification of the position of the grid 36 (or 36') and, consequently, that of the stream of air delivered, as shown in the semi-dashed lines of FIG. 6.

Figure 7:
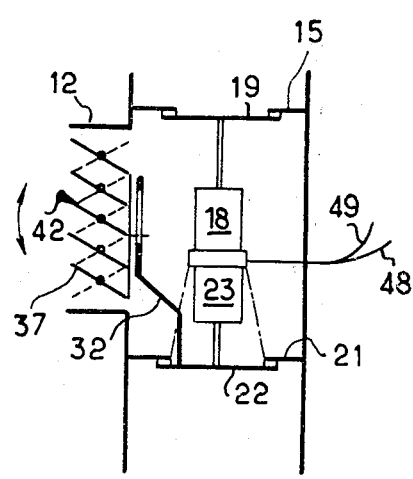

Similarly, the position of the grid may be changed when, as shown in FIG. 7, the two dampers 15-19 and 21-22 (or 15'-19' and 21'-22') are closed, a condition which occurs when the jack 18 (or 18') is at rest and such that the jack 23 (or 23') is operational, i.e., when one desires to neither defrost the windows, nor to permit the exterior air to penetrate into the passengers compartment.

If, from the condition shown in dashed lines in FIG. 6, one desires to go to the defrosting condition for the lateral windows, it suffices to close the damper 15-19 (or 15'-19') and to open the damper 21-22 (or 21'-22'). The air vent is thus fed with warm air and, simultaneously, the mechanical transmission 32 (or 32') brings the grid 36 (or 36') into the position optimum for the defrosting, without the occupants of the front seats having to perform any manoeuvre other than to place a command switch into a "defrost" position.

One is thus able to simplify considerably the control of a temperature control installation of a vehicle or the like comprising an aeration device according to the invention.

Concerning the embodiment of FIG. 2, one will note that the passage of the grid from the condition shown in dashed-lines in FIG. 6 to the defrosting condition of the side windows, passage which is effected by displacement of the mechanical transmission 32' in the direction of the arrow P, can also cause a rotation of the same grid elements around the axis 40, at the same time as the orientation of the elements of the grid 36' is changed with respect to the direction 41' parallel to the axis 13' depending on the shape of the opening 57 previously described.

In an advantageous fashion, the command switch is connected to the aeration device of the driver as well as to that of the passenger adjacent to the other door such that the vents of each of the two aeration devices are simultaneously placed in defrosting position, when conditions are such as to necessitate such a position.

When the control jacks are vacuum jacks, they are mounted in a manner such that the damper for feeding the vent with warm air is open when the jack is open to the atmosphere. With such a mounting, all deterioration or damaging of the jacks, or of their associated elements, for example the connecting tubes, automatically brings the grid into the condition which is that corresponding to defrosting.

A third embodiment of the device according to the invention is illustrated in FIGS. 8 to 12. It comprises an air vent 110 in which is mounted a grid for orienting the stream of air which the vent delivers. This being in addition connected to a conduit (not shown) having, on one side, a damper, or the like, for the feed control of fresh air and, on the other side, another damper, or the like, for feed control of the said conduit of warm air, in a fashion analogous to the first two embodiments described.

The air orientation grid mounted in the vent 110 comprises a frame or box and two sets of fins perpendicular to one another. The first set is constituted by the fins $111_1$, $111_2$, $111_3$ movable with respect to the said frame, parallel amongst themselves. The second set is constituted by fins $112_1$, $112_2$, $112_3$, $112_4$ which are fixed with respect to the frame, are equally parallel amongst themselves, and are mounted between two walls 113 and 114 which, together with walls 115 and 116 perpendicular to the walls 113 and 114, define the frame of the grid.

The walls 113 and 114 of the frame of the air orientation grid are pivotably mounted in the air vent around an axis 119 in an arrangement such that a minimum amount of play is provided between its walls 113 and 114 and the associated walls of the vent, and that a significantly larger space, 115' and 116' respectively, is provided between each of the walls 115 and 116 of the frame of the grid and the corresponding walls of the vent (FIG. 10).

The movable fins $111_1$ to $111_3$ are each pivotably mounted on the air vent around the respective axes $118_1$, $118_2$ and $118_3$ (FIG. 9). Furthermore, a rig 117 permits connection between them the said fins $111_1$ and $111_3$. Each fin is arranged to pivot with this rig in a fashion which permits the rotation of the said fins around the respective axes $118_1$, $118_2$, $118_3$.

The means of manipulating the grid as result of which, on the one hand, the fins constituting the grid can be manually moved while the grid blows only fresh air or no air, and, on the other hand, the grid is automatically brought into a position in which it orients the stream of warm air towards the side windows when the vent is fed partially or totally with warm air, comprises a flexible cord 120. This cord has one of its ends fixed at a point A at the upper end of the movable rig 117 (as shown in FIG. 9). The other end of the cord 120 is fixed to an arm 121 pivotably connected, on the one hand, to a shaft 122 of a jack 123a controlling the feed of warm air to the vent and, on the other hand, to a tab or flange 123 connected to the vent.

A jack controlling the feed of fresh air to the vent is equally provided as in the two preceding embodiments. The control of the feed of warm air, of fresh air or of a mixture of warm air and fresh air being, in this case, analogous to that of the first two embodiments hereinabove described, and thus is not specifically further described in detail at this point.

In addition, the cord is guided through a ring 124 provided at a point B on shaft 125 mounted at a location fixed in the vent 110 supporting the air orientation grid, behind the said grid (FIG. 9).

The location of the points of attachment A and of guidance B of the cord must satisfy certain requirements.

The point of attachment A of the cord on the movable rig supporting the fins $111_1$, $111_2$, $111_3$ must not be situated on any of the said axes $118_1$, $118_2$ or $118_3$ or their extensions. Moreover, this point A must not be located on the axis 119 or its extension.

The fixed guidance point B must be located in such a way that, when the cord 120 is extended between the points A and B, this cord has, between the said points A and B, a direction oblique both with respect to the direction of the axis 119 and with respect to that of the axes $118_1$, $118_2$ and $118_3$.

These latter devices have for an aim to permit the rotation of the fins around their respective axes $118_1$ to $118_3$ as well as the rotation of the frame of the grid around the axis 119 when one exercises traction on the flexible cord 120.

These requirements being satisfied, the location of the points of attachment A and of guidance B may be chosen at will.

The functioning of the manipulation means according to this third embodiment is as follows:

When the jack 123a is compressed, the cord hangs freely by virtue of the upward displacement of its end fixed to the arm 121. The fins $111_1$, $111_2$, $111_3$ can thus be oriented manually, on the one hand, by making them turn about their respective axes $118_1$, $118_2$ and $118_3$ (for example by an angle $\alpha$ FIG. 9) and, on the other hand, making the frame of the grid turn around the axis 119 (for example by an angle $\beta$, FIG. 12). It is to be noted that, when the frame of the grid has pivoted around the axis 119, the fins $112_1$ to $112_4$ pivot equally around the said axis 119. This corresponds to the aeration condition.

The extension of the jack 123a causes tensioning of the cord 120, which in turn causes a two step pivoting of the grid.

In a first step, the fins $118_1$ ... $118_3$, which are located initially in the position shown in FIG. 9, pivot in an angle $\alpha$ around their respective axes $118_1$ ... $118_3$, to arrive at the position shown in FIG. 11.

In a second step, by virtue of the tension maintained on the flexible cord, on the one hand, and the free space provided on each side of the grid with respect to the walls of the vent 110, on the other hand, the grid is brought to pivot in its entirety along an angle $\beta$ around the axis 119 and to assume the position shown in FIG. 12. This position corresponds that of defrosting, the orientation of the grid being locked in a fashion such that the air is guided toward the side window with which the aeration device is associated and at the same time upwards.

The manipulation means of the air orientation grid are thus of particularly simple construction and, being given that each part does not move relatively with respect to another, there is no wear. This cord device furthermore permits great flexibility of functioning, the manual movement being in no way hindered by the presence of the mechanical parts behind the grid. Manipulation with the cord according to the invention permits a certain margin of mishandling, in particular when traction is applied to the fins when the grid is in its locked position of defrosting, by virtue of the flexibility of the cord.

Advantageously, an aeration device is placed adjacent to each of the front lateral windows of the vehicle. It is equally possible to equip the vehicle with a greater number of such aeration devices, a device being for example placed adjacent each of the side rear windows as well as adjacent to the rear window.

The drawings and specification present a detailed disclosure of a preferred embodiment of the invention, and it is to be understood that the invention is not limited to the specific forms disclosed, but covers all modifications, changes and alternative constructions falling within the scope of the invention as defined by the claims.

I claim:

1. An air ventilation device comprising:
   a feed for introducing warm air;
   a feed for introducing fresh air;
   movable air distribution means for distributing the air coming from said feeds in a direction which depends from the position of said movable air distribution means;
   first means comprising dampers for controlling said feeds to said air distribution means; and
   transmission means for connecting said first means to said air distribution means such that when said first means is in a first position corresponding to the introduction of warm air, the air distribution means is locked into a single position and cannot be displaced significantly, and when said first means is in a position different from the first, corresponding to the introduction of fresh air, said air distribution means is free to move in at least one direction and is adapted to be hand controlled, said transmission means comprising a flexible cord, one end of said cord being operatively connected to said damper which controls warm air flow, the other end of said cord being attached to said air distribution means at an attachment point.

2. The device of claim 1 wherein said cord, in passing from said air distribution means to said connection with said air distribution means, passes through a ring.

3. The device of claim 2 wherein said air distribution means comprises a plurality of fins, each of said fins being pivotable around an axis, and air distribution means further being pivotable around an axis which is not parallel to said fins, said ring and said attachment point being located at a point which does not lie on any of the said axes or their extensions.

4. A vehicle comprising a passenger compartment and at least one window, said vehicle further comprising
a feed for introducing warm air;
a feed for introducing fresh air;
movable air distribution means for distributing the air coming from said feeds in a direction which depends from the position of said movable air distribution means;
first means for controlling said feeds to said air distribution means; and
transmission means for connecting said first means to said air distribution means such that when said first means is in a first position corresponding to the introduction of warm air, said air distrubtion means is locked into a single position whereby it is directed toward at least one window of said vehicle, and when said first means is in a position different from the first, corresponding to the introduction of fresh air, said air distribution means is free to move in at least one direction and is adapted to be hand controlled.

5. An air ventilation device comprising:
a feed for introducing warm air;
a feed for introducing fresh air;
movable air distribution means for distributing the air coming from said feeds in a direction which depends from the position of said movable air distribution means;
first means for controlling said feeds to said air distribution means; and
transmission means for connecting said first means to said air distribution means such that when said first means is in a first position corresponding to the introduction of warm air, said air distribution means is locked into a single position and cannot be displaced significantly and when said first means is in a position different from the first, corresponding to the introduction of fresh air, said air distribution means is free to move in at least one direction and is adapted to be hand controlled.

6. The device of claim 5 wherein said means for controlling the feeds to said air distribution means comprise dampers.

7. The device of claim 6, wherein said dampers are connected to vacuum jacks.

8. The device of claim 6, wherein said transmission means has two ends, one end of which is operatively connected to one of said dampers.

9. The device of claim 8, wherein the damper to which said one end of said transmission means is connected controls the flow of warm air.

10. The device of claim 8, wherein said air distribution means comprises a plurality of fins, said fins being pivotably connected to a common element, said common element comprising a protrusion.

11. The device of claim 10, wherein said transmission means comprises a double armed bar, one end of said bar being connected to said damper while the other end of said bar has a slit therein, said bar being arranged such that said protrusion fits within said bar.

12. The device of claim 8, wherein said air distribution means comprises a plurality of fins supported by a shaft having a plurality of brackets, said shaft further comprising an element having a triangular opening; said transmission means comprising a regulator arm having a protrusion at its end spaced from said damper, said regulator being arranged such that said protrusion fits within said triangular opening.

13. The device of claim 12, wherein said opening is curvilinear.

* * * * *